(12) United States Patent
Nohr

(10) Patent No.: US 6,189,941 B1
(45) Date of Patent: Feb. 20, 2001

(54) ENERGY-ABSORBING DEFORMATION SYSTEM

(75) Inventor: Matthias Nohr, Stuttgart (DE)

(73) Assignee: DaimlerChrylser AG, Stuttgart (DE)

( * ) Notice: Under 35 U.S.C. 154(b), the term of this patent shall be extended for 0 days.

(21) Appl. No.: 09/237,375

(22) Filed: Jan. 26, 1999

(30) Foreign Application Priority Data

Jan. 28, 1998 (DE) .............................................. 198 03 156

(51) Int. Cl.$^7$ .................................................. B60R 19/40
(52) U.S. Cl. ........................ 293/118; 293/119; 293/135; 188/371
(58) Field of Search ................................... 293/118, 119, 293/107, 110, 134, 135; 188/371, 372, 376, 377; 267/139

(56) References Cited

U.S. PATENT DOCUMENTS

| | | | |
|---|---|---|---|
| 2,692,618 | * 10/1954 | Ludowici | 92/101 |
| 3,934,912 | * 1/1976 | Ogihara et al. | 293/119 |
| 3,947,061 | * 3/1976 | Ellis | 293/119 |
| 4,474,257 | * 10/1984 | Lee | 293/118 |
| 4,815,777 | * 3/1989 | Campbell | 293/107 |
| 5,033,569 | * 7/1991 | Hayes | 293/118 |
| 5,370,429 | * 12/1994 | Reuber et al. | 293/119 |
| 5,810,427 | * 9/1998 | Hartmann et al. | 293/119 |

FOREIGN PATENT DOCUMENTS

| | | |
|---|---|---|
| 1991809 | 2/1967 | (DE) . |
| 1931844 | 4/1970 | (DE) . |
| 4206716A1 | 9/1992 | (DE) . |
| 4425830C2 | 8/1996 | (DE) . |

* cited by examiner

*Primary Examiner*—D. Glenn Dayoan
*Assistant Examiner*—Patricia Engle
(74) *Attorney, Agent, or Firm*—Evenson, McKeown, Edwards & Lenahan, P.L.L.C.

(57) ABSTRACT

An energy-absorbing deformation system for a motor vehicle has at least one collapsing section movable with energy absorption from an extended absorption position into a telescoped deformation position. The at least one collapsing section is held in the normal resting position in its deformation position, and a drive device is associated with the at least one collapsing section. The collapsing section can be moved abruptly into an absorption position when the drive device is activated.

21 Claims, 1 Drawing Sheet

ENERGY-ABSORBING DEFORMATION SYSTEM

BACKGROUND AND SUMMARY OF THE INVENTION

This application claims the priority of German application 198 03 146.4, filed in Germany on Jan. 28, 1998, the disclosure of which is expressly incorporated by reference herein.

The invention relates to an energy-absorbing deformation system for a motor vehicle with at least one collapsing section that is movable with energy absorption from an extended absorption position into a collapsed deformation position.

Energy-absorbing deformation systems of this kind in the form of collapsing tubes in which energy absorption takes place as the result of rolling bending of the collapsing tube walls are generally known. Special reference is made here to German Patent Document DE-AS 1,931,844, which shows an impact-damping device for a motor vehicle, in which a ring made of plastically deformable metal is additionally provided as the guide part for the collapsing tube, said ring being rounded to face the collapsing tube. A similar energy-absorbing deformation system for a motor vehicle is known from German Patent Document DE 42 06 716 A1.

A goal of the invention is to provide an energy-absorbing deformation system of the type referred to above that can be accommodated in a compact manner by comparison with the prior art.

This goal is achieved according to the invention by virtue of the fact that the at least one collapsing section is held in its deformation position in its normal resting position and in that a drive device is associated with the at least one collapsing section, by means of which device the collapsing section can be moved abruptly into an absorption position when the drive device is activated. During the normal operation of the motor vehicle, the collapsing section is therefore in its telescoped deformation position, so that it has a reduced size and can be positioned in a visually unobtrusive manner in the vehicle. The fact that the collapsing section is pressed by the drive device abruptly into its absorption position means that it can when necessary nevertheless be varied accordingly in proper time for energy absorption. The solution according to the invention is provided for absorbing impact, with an important advantage of the solution according to the invention being the suitability of the deformation system for multiple acceptance of corresponding impact loads. The drive device is able to bring the collapsing section, depending on the fatigue phenomena of the material, back to the absorption position for a plurality of successive exposures to impact. The deformation system according to the invention is preferably located in the vicinity of the external contours of the vehicle, especially in the front or rear area or at the sides of the vehicle.

In certain embodiments of the invention, the drive device is connected to an activation control integral with the vehicle that controls the drive device as a function of signals from an impact sensor system. As a result, the displacement of the collapsing section from the telescoped deformation position into an extended absorption position takes place similarly to the expansion of airbag systems in the vehicle interior. Advantageously, a traffic monitoring camera is associated with the activation control, said camera triggering the activation control and hence actuating the drive device shortly before a vehicle impact occurs, so that the collapsing section already presents its increased deformation length when the vehicle impact occurs.

In certain preferred embodiments of the invention, the drive device is designed as a linearly operating pressure device which acts on the at least one collapsing tube upon activation, opposite to the direction of action of a deformation force. As a result, the collapsing section is guided opposite to the directional action of an impact shortly before this impact load is applied in order to make the increased deformation length available for energy absorption.

In certain preferred embodiments of the invention, she pressure device can be controlled by means of the activation control at various energy levels in such fashion that the at least one collapsing section can be moved into various absorption positions. As a result it is possible, depending on the subsequent impact load, to provide a variety of energy absorption capacities, with the activation control, for this purpose, evaluating in particular the respective road speed and/or the relative speed with respect to the obstacle that appears.

Other objects, advantages and novel features of the present invention will become apparent from the following detailed description of the invention when considered in conjunction with the accompanying drawings.

DETAILED DESCRIPTION OF THE DRAWINGS

Figure 1:
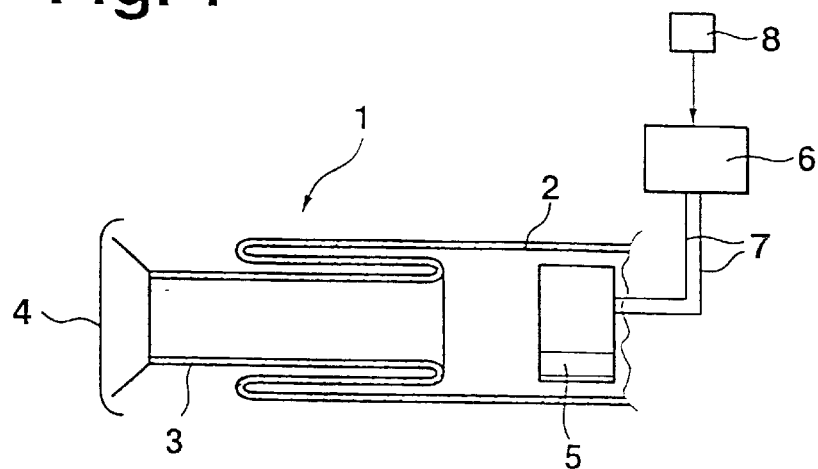
FIG. 1 is a schematic view of an embodiment of a deformation system according to the invention in which a collapsing section is shown in a standby position.
Figure 2:
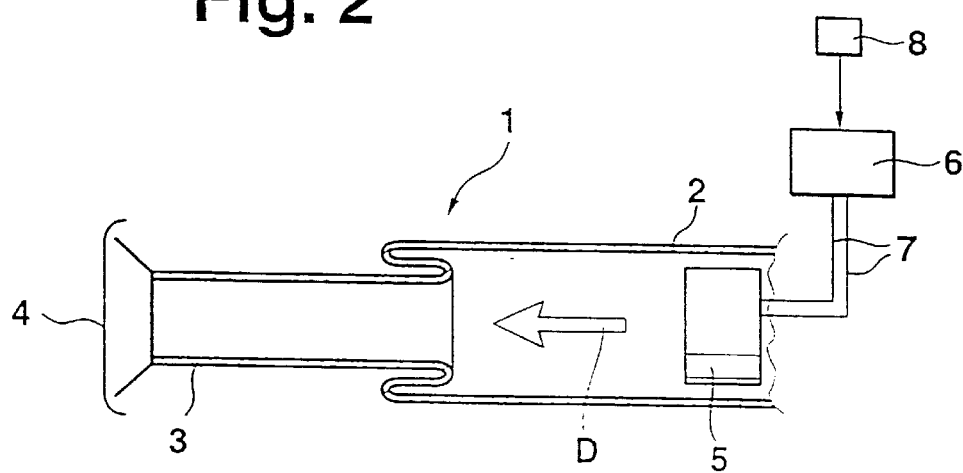
FIG. 2 shows the deformation system according to FIG. 1 in which the collapsing section is in an absorption position.
Figure 3:
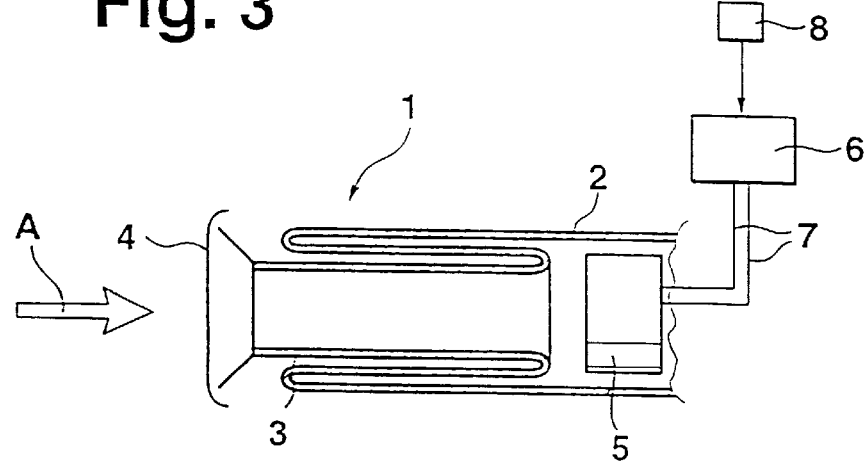
FIG. 3 shows the deformation system according to FIGS. 1 and 2 in which the collapsing section is in a telescoped deformation position.

A deformation system 1 which absorbs energy and is shown only schematically in FIGS. 1 to 3 is provided to absorb impact in a front area of a motor vehicle. Deformation system 1 has a receiving sleeve 2 positioned integrally with the vehicle, connected with a collapsing section 3 located so that it is coaxially displaceable, with the collapsing section 3 being located displaceably coaxially within receiving sleeve 2. Collapsing section 3 is made tubular and has a bumper 4 at its front end. The walls of collapsing section 3 are rolled like bellows and make a transition to receiving sleeve 2. Designing the transition between receiving sleeve 2 and collapsing section 3 as a bellows allows it to be plastically deformable, and preferably made of a plastically deformable metal. The bellows-like transition is subjected in a manner known of itself to a rolling bend in accordance with the principle of upsetting, as soon as compressive or tensile loads are exerted coaxially with the central lengthwise axis of collapsing section 3 and receiving sleeve 2 on collapsing section 3 or on bumper 4. As a result of the work of deformation, impact energy can be destroyed during such a movement of collapsing section 3.

According to the view in FIG. 1, collapsing section 3 is in a position relative to receiving sleeve 2 in which it is pushed almost completely telescope-wise into receiving sleeve 2. This position constitutes the resting state of deformation system 1 for normal operation when driving the vehicle. A drive device 5, shown only schematically, is accommodated in the vicinity of receiving sleeve 2, said device being able upon activation of exerting a compressive force in the direction of arrow D (FIG. 2) on collapsing section 3 in such fashion that collapsing section 3 is forced out suddenly into an absorption position (FIG. 2) from receiving sleeve 2. In this absorption position, increased deformation travel is available for collapsing section 3, in which collapsing section 3, upon being subjected to an impact load in the direction of arrow A on bumper 4, can be pushed back against the direction of the pressure into receiving sleeve 2, with deformation work being performed in the vicinity of the bellows-like upset. As can be seen from FIG. 3, collapsing section 3, even in the standby position shown in FIG. 1, can be pushed into receiving sleeve 2. In one embodiment of the invention that is not shown, however, the deformation position shown in FIG. 3 and the standby position shown in FIG. 1 can be the same.

The abrupt forcing outward of collapsing section 3 from receiving sleeve 2 takes place only when required, in other words only when there is a threat of impact with the vehicle. In order to be able to control drive device 5 correctly for this purpose, drive device 5 is connected by control leads 7 of activation control 6 that controls drive device 5 as a function of suitable signals from an impact sensor system 8. Preferably drive device 5 is designed as a pressure reservoir with a combined triggering unit, so that when the triggering unit is triggered, the pressure reservoir is abruptly emptied in the direction of collapsing section 3, so that the likewise abrupt linear movement of collapsing section 3 into the absorption position shown in FIG. 2 takes place because of the pressure wave.

Deformation system 1 also has a stop device, integral with the vehicle and not shown, for collapsing section 3, said stop device being located so that collapsing section 3 cannot move beyond the absorption position under the influence of pressure force D, so that in any event collapsing section 3 can be pressed backward at least largely reversibly as a result of impact load A.

It should be clear to the individual skilled in the art from the schematic representation in FIGS. 1 to 3 that the deformation system according to the invention can have not only a single collapsing section but also a plurality of collapsing sections that are arranged in parallel and controlled jointly. The collapsing sections are connected with a common bumper or with individual bumpers according to various preferred embodiments of the invention. Accordingly, either a single drive unit can be provided for each collapsing section or a common drive unit can be provided for all the collapsing sections.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Energy-absorbing deformation system for a motor vehicle with at least one plastically deformable collapsing section that is movable with energy absorption from an extended absorption position into a telescoped deformation position, wherein the at least one collapsing section is held in a deformation position in a normal resting position, and
   wherein a drive device is associated with the at least one collapsing section, and operable to suddenly move the collapsing section into an absorption position when the drive device is activated.

2. Deformation system according to claim 1, wherein the drive device is connected to an activation control integral with the vehicle, said control controlling the drive device as a function of signals from an impact sensor system.

3. Deformation system according to claim 2, wherein the drive device is designed as a linearly acting compression device which acts on the at least one collapsing section upon activation opposite to the direction of action of a deformation force.

4. Deformation system according to claim 3, wherein the compression device can be controlled by means of activation control at different energy levels so that the at least one collapsing section can be moved into different absorption positions.

5. Deformation system according to claim 1, wherein the drive device is designed as a linearly acting compression device which acts on the at least one collapsing section upon activation opposite to the direction of action of a deformation force.

6. Deformation system according to claim 5, wherein the compression device can be controlled by means of activation control at different energy levels so that the at least one collapsing section can be moved into different absorption positions.

7. Deformation system according to claim 1, wherein the at least one collapsing section comprises a plastically deformable tubular-shaped material within a sleeve.

8. Deformation system according to claim 7, wherein the drive device includes a pressure reservoir which is selectively communicated with a hollow space in the collapsing section.

9. Deformation system according to claim 8, wherein the compression device can be controlled by means of activation control at different energy levels so that the at least one collapsing section can be moved into different absorption positions.

10. Deformation system according to claim 7, wherein the tubular shaped material is plastically deformable metal.

11. Deformation system according to claim 1, wherein the at least one collapsing section has walls in the form of bellows.

12. Energy-absorbing deformation system for a motor vehicle, comprising:

at least one collapsible unit with a plastically deformable collapsing section which is movable with energy absorption from an extended absorption position to a telescoped deformation position,
   means for holding the collapsing section in a normal rest position spaced from the extended absorption position, and
   a selectively actuable drive device operable to suddenly move the collapsing section from the rest position to the extended absorption position.

13. A system according to claim 12, wherein the drive device is connected to an activation control integral with the vehicle, said control controlling the drive device as a function of signals from an impact sensor system.

14. A system according to claim 13, wherein the drive device is designed as a linearly acting compression device which acts on the at least one collapsing section upon activation opposite to the direction of action of a deformation force.

15. A system according to claim 12, wherein the drive device is designed as a linearly acting compression device which acts on the at least one collapsing section upon activation opposite to the direction of action of a deformation force.

16. A system according to claim 15, wherein the compression device can be controlled by means of activation control at different energy levels so that the at least one collapsing section can be moved into different absorption positions.

17. A system according to claim 12, wherein a vehicle bumper is carried by the at least one collapsible unit.

18. A system according to claim 17, wherein a plurality of said collapsible units are provided for carrying the bumper.

19. Deformation system according to claim 12, wherein the at least one collapsing section comprises a plastically deformable tubular-shaped material within a sleeve.

20. Deformation system according to claim 19, wherein the drive device includes a pressure reservoir which is selectively communicated with a hollow space in the collapsing section.

21. Deformation system according to claim 20, wherein the tubular shaped material is plastically deformable metal.

* * * * *